United States Patent [19]
Gurfinkel

[11] Patent Number: 5,902,664
[45] Date of Patent: May 11, 1999

[54] ADJUSTABLE SKIMMER BELT

[76] Inventor: Benjamin Gurfinkel, 6935 Condon St., San Diego, Calif. 92122

[21] Appl. No.: 08/666,963

[22] Filed: Jun. 20, 1996

Related U.S. Application Data

[60] Provisional application No. 60/001,464, Jul. 17, 1995.

[51] Int. Cl.⁶ ........................................................ B32B 3/10

[52] U.S. Cl. .............................. 428/134; 428/88; 428/93; 428/99; 428/114; 474/237; 474/240; 474/241; 474/273; 210/242.4

[58] Field of Search ...................................... 474/237, 240, 474/241, 266, 273; 210/242.4; 428/85, 88, 93, 95, 96, 99, 102, 105, 107, 109, 114, 119, 123, 134, 137, 213, 220

*Primary Examiner*—Merrick Dixon
*Attorney, Agent, or Firm*—Frank G. Morkunas

[57] ABSTRACT

An improved adjustable skimmer belt having a belt of two layers at least one of which has an outer surface of non-absorbent oleophilic-oriented hydrophobic loop-type fibers, vertical and horizontal stitching creating a repeating pattern and used to attach the layers, a plurality of apertures transversing the layers following the repeating pattern thereby creating liquid-collecting pockets between the two layers, and a connector and adjustor formed by the pattern and used to cut and adjust or repair the belt as needed.

13 Claims, 2 Drawing Sheets

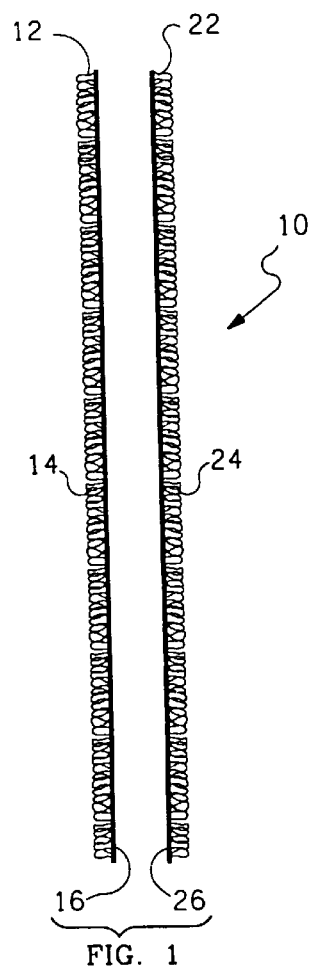
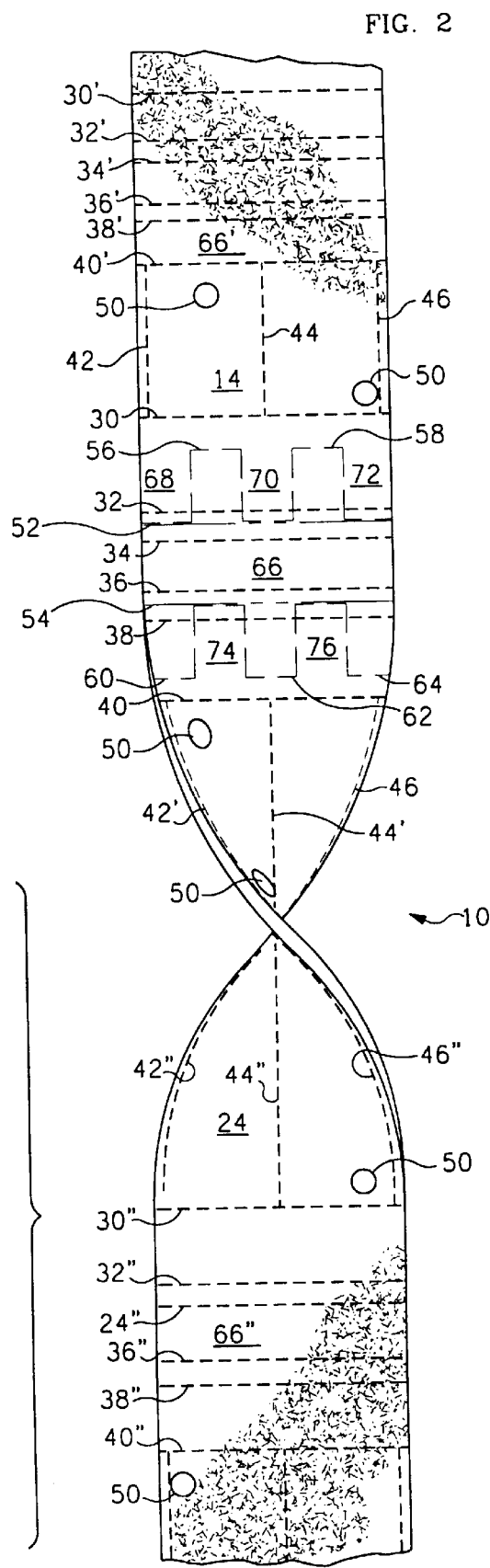
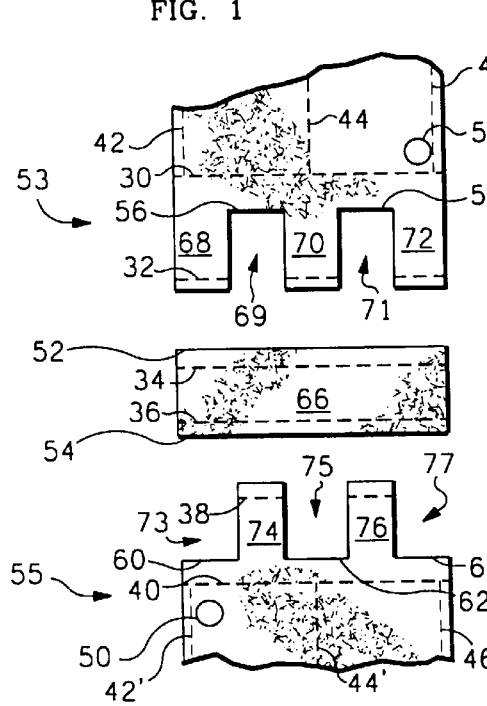
FIG. 1
FIG. 2
FIG. 3

ADJUSTABLE SKIMMER BELT

This application claims the benefit of U.S. Provisional Application Number 60/001,464 filed on Jul. 17, 1995.

BACKGROUND OF THE INVENTION

This invention relates to oil skimmers, specifically to tramp-oil skimmer belts used in association with a variety of oil-skimming apparatus Tramp-oil generally comprises hydraulic oils, lubricants, and other undesirable oils.

Industrial work which involves metal working such as milling, tooling, machining, boring, and the like, uses high-speed power tools for that purpose A variety of industrial solutions are used to lubricate and to cool the work piece and the machine or tool associated with that work piece. Industrial solutions, such as coolants, are costly When invariably, and unavoidably, tramp-oil becomes mixed with industrial solution, the useful life of the industrial solutions is greatly diminished A need exists to remove tramp-oils from the industrial solution (generally a water miscible cutting and grinding fluid).

The purpose of removing tramp-oil from another industrial solution is to maintain that industrial solution in a contamination-free state and to thereby reduce bacterial growth potential therein. Many apparatus and belts used in association with tramp-oil removal work well in situations where tramp-oil is prevalent in great concentrations and is visible. The belts have an oleophilic hydrophobic quality which is suitable to the purpose. In instances where tramp-oil is in an emulsified state, these belts come up 'dry' thereby leaving traces of emulsified tramp-oil in the industrial solution for extended periods of time. Left in this state leads to bacterial growth, contamination, and costly replacement of the industrial solution.

Tramp-oil, even in trace amounts, provides a food source for bacteria and thereby contributes to its growth. Because of such growth, the work place becomes filled with an undesirable rancid and foul-smelling order. Tramp-oil is also the source smoke-mist and oil-mist in the work place. Quality of the work place suffers. These are valid health-related, environmental, and quality-of-life concerns for the well-being of the worker. Quality of work is also affected by the presence of tramp-oil. Tramp-oil reduces the useful life of the machine tool and the useful life of the industrial solution used in the machining process. It provides a means by which undesirable residues are retained in the work place and desposited on the work piece and the machine tool. Overall, the product suffers in time expended to produce it and in the quality of finished product itself. The presence of tramp-oils also results in increased maintenance requirements in the work place. Tramp-oil is the scourge to industry and any efficient means of eliminating tramp-oil will greatly enhance the quality of finished products and quality of life in the work place for the machinist.

Generally, contaminated industrial solutions, even with trace amounts of contaminate, will last for a short period of time. After that, the contaminated fluid is disposed-of and replaced. The problems associated with this method are two-fold—this cure incurs a double cost. One cost for the proper packaging of the contaminated industrial solution and its proper disposal and another for the cost of new industrial solution. A third, indirect but associated problem is final disposal. In an already crowded eco-sphere, limiting waste streams becomes crucial. Disposing of industrial solutions before their time adds to rather than decreases our waste stream.

Adding a bactericide to the industrial solution to kill the bacteria is yet another attempt at curing some problems associated with the presence of tramp-oil. In this cure, one problem was substituted for another since it was found that most bactericides irritated human skin. The problems associated with trace amounts of tramp-oil remain unabated.

Pick-up belts currently used for the purpose of removing tramp-oil are made of a synthetic rubber or rubber-like material. They are non-absorbent and pick-up tramp-oils based on their respective oleophilic and glue-like qualities. Because of their glue-like qualities to oils, these belts are suited for use in industrial solutions with high degrees of oil contamination. These belts are typically associated with the Oylbelt Skimmer™ and the Scrounger®, Jr. In industrial solutions where tramp-oil is emulsified, these belts run dry leaving the industrial solution, with its contaminating tramp-oil, in the industrial solution's container. Within a short period of time, bacterial growth is fostered and the quality of the industrial solution, working environment, and work piece suffers. Not only does this type belt fail to pick-up the industrial solution, it is extremely costly.

A less costly belt, made from the loop-like fibers of a hook-and-loop fastening material positioned on both sides, also works well in tramp-oil saturated situations but not in those situations where tramp-oil is emulsified. Most prior art inventions involve a complete skimming apparatus. The type of belt used is peripheral to the invention.

Koller (U.S. Pat. No. 4,274,957) discloses a self-contained skimmer utilizing a flexible endless belt made of a neoprene fabric and having a mat finish. The outer surface of the belt should be wettable by the liquid to be removed.

Threadgill (U.S. Pat. No. 4,652,372) discloses a liquid separator having an endless belt for skimming oils from a liquid body. The belt is made of material wettable by oil and that which exhibits oleophilic characteristics on its surface. It is oleophilic on both sides of the belt.

Lewan (U.S. Pat. No. 5,062,953) discloses a belt-type skimmer apparatus which utilizes an endless belt which is engaged between pincher rollers and weighted down in liquid.

Kaylor (U.S. Pat. No. 5,200,083) discloses a skimmer apparatus whose oil removal capabilities are enhanced by use of an oil-avid non-woven mat of oleophilic fibers, preferably a polyolefin or polypropylene, and preferably backed on one side with a heavy polyolefin film cover, on its liquid-contact member. The primary contacting member is the drum. In belt-type skimmers, the belt is composed similarly as is the drum.

Bronnec, et. al., discloses a hydrocarbon extractor of the belt-skimmer type. The belt is an endless belt made of oleophilic material, such as a polyester coated with polyurethane. The opposite outer surfaces of the belt are modified by abrasion.

None of these prior art concepts utilizing a belt has grasped the loop-type belt concept, as taken from the hook-and-loop type fasteners, wherein two loop sides are connected by their respective backsides thereby exposing both loop sides to the liquid, as a viable means of skimming oils from liquids. None that is except Betts, et.al. (U.S. Pat. No. 4,876,011). Betts discovered, must like applicant, that loop sides so configured make a surprisingly good skimming material. The belt is an endless belt fashioned of hydrophobic non-absorbent material. The sewing of two such materials, back-to-back, exposing the loop sides for oil skimming is where the similarity ends. Though such a belt performs reasonably well where the amount of oil is heavy, it does not perform well where oil quantities are low or partially emulsified or emulsified. It has been discovered that strategic placement of stitching and apertures enhance the liquid collection and skimming capabilities of such a belt and permit it to gather emulsified oils. Moreover, none of the prior art disclosures reveal or suggest adjustability, selective repairability, or selective replaceability as does the current invention.

None of the prior art belts can draw out industrial solutions which contain tramp-oils in trace, emulsified amounts. Likewise, none of the prior art belts are configurable at the work place into endless loops or adjustable in the manner of the present invention.

The essence of the present invention lies in its stitching configuration, its versatility and adjustability, and the hydrophillic absorption quality of the otherwise hydrophobic-oriented belt which is created by the plurality of apertures configured throughout which also create liquid-collecting pockets in between the two layers. The improved adjustable skimmer belt not only solves the problems associated with prior art belts, but is it less costly, lasts longer, and is adjustable. It can be easily fitted into any workplace and to any work piece. If any section of the belt becomes damaged, the damaged section or sections can be easily removed and the belt can be easily reconnected for continued and virtually uninterrupted use.

SUMMARY OF THE INVENTION

The problems associated with emulsified tramp-oils remaining in industrial solutions set forth above, among other problems, are overcome by the present invention, an improved adjustable skimmer belt, which comprises a belt of two layers at least one of which has an outer surface of non-absorbent oleophilic-oriented hydrophobic loop-type fibers, means to attach the layers, a plurality of apertures transversing the layers, and means to adjust and connect the belt.

Though the improved belt has absorbent qualities, its composition is not necessarily absorbent material In a preferred embodiment, the surface of the improved belt contains a plurality of minute loops made of a synthetic non-absorbent material (e.g., the loop-side of a hook-and-loop type fastening means). Because of the plurality of apertures throughout, these loops have a greater capacity to pick-up and hold oils. The invention has looped fibers having apertures breaching the integrity of the loops and layers thereby establishing an absorbent-like oleophilic-like liquid-collecting quality suited for capturing an industrial solution containing emulsified tramp-oils therein and in pockets between layers created thereby. Because the belt is not made of typical absorbent material, it is longer lasting and more suited for continued industrial use. An adjusting means on the belt enhances its versatility by permitting on-site, immediate, inexpensive repairs on the belt thereby further enhancing its useful life. It can be used on squeezing and scraping type skimmers.

The invention is well-suited for removing water-resistant oils and oil-like substances (e.g., hydraulic oils, lubricants, and other undesirable oils—tramp oils) from water-miscible industrial solutions (generally coolant industrial solutions used by machine tools in metal cutting and grinding operations). The improved belt is, however, not limited to machine processing operations. On a larger scale, it can be used to pick-up any petroleum-based product which is in suspension, or emulsified, in water or other oil-repellent industrial solutions.

A preferred method of adjusting the belt comprises executing two transverse separations at a pre-determined locations, across the width of the belt, as defined by the stitching on the belt. The result is a connector piece, a first belt section, and a second belt section. The next step requires creating tabs in each belt section by separating sections from the ends of each belt section at pre-determined locations. This creates cooperating and mating tabs (receiving means) and spaces (intercalating means) in each belt section. Each tab has slots running therethrough. The respective tabs and spaces are mated and the connector is drawn through the slots of each mated tab thereby connecting the belt ends into a continuous loop. Adjusting or repairing the belt entails the same procedures. In the case of adjustment, required length is determined and the belt is sized in accordance with the length requirements. In the case of repairs, the worn section is removed by separation at the pre-determined adjusting locations, separated accordingly, and re-connected following the steps outlined above.

Accordingly, several objects and advantages of my invention include:

efficiently and continuously removing trace tramp-oils emulsified in industrial solution;

minimizing bacterial growth in industrial solution;

minimizing the need to replace primary industrial solutions contaminated by tramp-oils;

minimizing costs associated with the complete removal of tramp-oils effected by replacing the primary industrial solution;

reducing the volume of waste products introduced into the waste stream;

enhancing quality of the work place environment by removing foul smells and skin irritants;

minimizing the need to replace the belt when one or more sections become damaged;

increasing the useful life of the belt;

increase the useful life of machine tools; and enhancing work efficiency and quality of finished product Other objects and features of the invention will become apparent as the drawings which follow are understood by reading the corresponding description thereof.

BRIEF DESCRIPTION OF THE DRAWING FIGURES

FIG. 1 is an exploded side elevation view of the belt.

FIG. 2 is a front elevation view of the belt.

FIG. 3 is a partial view of a connecting portion of the belt.

DETAILED DESCRIPTION OF THE PREFERRED EMBODIMENTS

Figure 4:
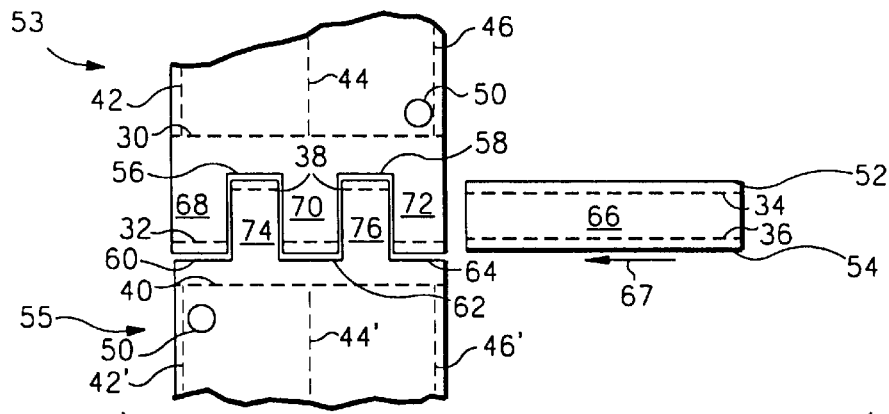
FIG. 4 is a partial view of the connecting process of the belt.

FIG. 1 shows belt 10 having first layer 12 and second layer 22. First layer 12 has first outer surface 14 and first inner surface 16. Second layer 22 has second outer surface 24 and second inner surface 26. First outer surface 14 and second outer surface 24 are comprised of non-absorbent looped fibers with oleophilic-like qualities, such as the loop portion of a hook-and-loop fastening means or any other material suited for the intended purpose.

FIG. 2 shows belt 10 in its un-cut state. The belt may be of any width and any length depending on its intended purpose. It may be pre-configured in an endless loop or it may be linear. If linear, it may be cut-to-fit by an end-user. For clarity, FIG. 2, and remaining figures, do not show detail of the loop-type fibers. Adjustability of belt 10 is reflected in a section designated between numerals 30 through 40. The pattern shown between numerals 40 through 40', which includes numerals 30 through 40, repeats regularly throughout belt 10. The ratio of repeat depends on the width of the belt and ranges between 2:1 and 12:1. For example, a belt with a 2-inch width has its pattern repeat about every 4 to 24 inches. The preferred repeat pattern ratio is 3:1; repeat pattern every 6 inches for a 2-inch wide belt. The repeating pattern is seen from 40' to 40, and from 40 to 40". A plurality of attaching means attach first layer 12 and second layer 22 (not shown in FIG. 2, refer to FIG. 1) to one another. Stitching or sewing are the preferred attaching means though any attaching means suited for the intended purpose may be used. In the pattern, first adjustment-attaching means 30, second adjustment-attaching means 32, third adjustment-attaching means 34, fourth adjustment-attaching means 36, fifth adjustment-attaching means 38, and sixth adjustment-attaching means 40, all run across the width of belt 10. All are parallel to one another and suitably spaced. Spacing will vary depending on the width of the belt and its intended purpose. By way of example only and not limitation, for a belt with a width of between 2 to 4 inches, spacing between first adjustment-attaching means 30 and second adjustment-attaching means 32 is between 1/4 to 5/8 of an inch. Spacing from second adjustment-attaching means 32 to third adjustment-attaching means 34; third adjustment-attaching means 34 to fourth adjustment-attaching means 36; and fourth adjustment-attaching means 36 to fifth adjustment-attaching means 38 all are between 1/8 to 3/8 of an inch. Spacing from fifth adjustment-attaching means 38 to sixth adjustment-attaching means 40 between 1/4 to 5/8 of an inch. On wider belts, spacing will be proportionately greater. These adjustment-attaching means are critical to the adjustability and versatility of belt 10. In the preferred embodiment, adjustment-attaching means are substantially horizontal in relation to an upstanding belt as shown in FIG. 2.

Belt 10 also contains a plurality of belt-attachment means. Belt 10 can contain at least two such belt-attachment means. In the preferred embodiment, belt 10 shows three belt-attachment means; first belt-attachment means 42, second belt-attachment means 44, and third belt-attachment means 46. These belt-attachment means may run, uninterrupted, the full length of the belt or, as shown in FIG. 2, may run substantially from first adjustment-attaching means 30 to pattern repeat 40'.

Also, as shown in FIG. 2, situated within this section (section running from numeral 30 through 40') is at least one aperture 50. Any number of apertures may be situated therein. In the preferred embodiment, at least two are placed therein. Aperture 50 may be of any shape or configuration provided such breaches the integrity of the loop-type fibers; i.e., cuts the loop. In the preferred embodiment, respective belt-attachment means are substantially vertical and are substantially perpendicular to the respective adjustment-attachment means. Any angles may be used for belt-attachment means and adjustment-attachment means provided belt layers 12 and 22 attach, connector 66 is formed, and mating tabs and spaces with slots therethrough are formed to receive connector 66.

A plurality of phantom separation lines 52, 54, 56, 58, 60, 62, and 64 are shown between first adjustment-attaching means 30 and sixth adjustment-attaching means 40. Within this pattern, when the respective separations are executed, a belt adjustment means and connection means for belt 10 are established. First separation line 52 and second separation line 54 are essential to the belt adjustment means and connection means. Any number of other separation lines may be used thereafter. These other separation lines, when executed, create tabs and mating spaces in the belt. For clarity and ease of expression and understanding, the drawings show 5 tabs and spaces being created; 3 tabs on one belt section (first belt section 53 in this example) and 2 mating tabs on another belt section (second belt section 55 in this example) For the adjustment means and connection means to properly function, at least one tab on one belt section and 2 tabs on the other belt section is required. Any number of mating tabs and spaces (tongue-and-groove like) may be used. It is preferred that the depth of the tabs (e.g., from first separation line 52 to third separation line 56 and their equivalents) be approximately the same distance as that distance between first adjustment-attaching means 30 and second adjustment-attaching means 32. The width of the tabs and mating spacing should be approximately the same as that of the depth of the tabs. As the width of the belt increases, the depth and width of the tabs (and spaces) will proportionately increase. The tabs and spaces may take on any shape such as, but not limited to, curved, squared, rectangular, triangular, and the like, provided they have slots therethrough and cooperate and mate with one another.

In the preferred embodiment, the tabs and spaces are substantially rectilinear. Using the preferred embodiment as an example in explaining the belt adjustment means and connection means, when executed, first separation line 52 and second separation line 54 establish first belt section 53, second belt section 55, and connector 66. When executed, third separation line 56 and fourth separation line 58 establish first tab 68, second tab 70, and third tab 72. When executed, fifth separation line 60, sixth separation line 62, and seventh separation line 64 establish fourth tab 74 and fifth tab 76 This pattern repeats throughout the length of belt 10 and is marked by numerals 30 through 40' above the above-described pattern and by numerals 30" through 40" below the above-described pattern. The belt may be sized anywhere the pattern repeats by executing the separation lines situated thereat.

Separation may be executed by cutting with scissors, knife, or equivalent instrument or by using a pre-formed pressing and cutting tool suited for the purpose. Such a pre-formed tool would be capable of executing all separations with one action. Without such a pre-formed tool, the preferred method requires first cutting at lines 52 and 54 to form first belt section 53 and second belt section 55; then cutting at lines 56, 58, 60, 62, and 64 to form respective tab and spaces. The order for cutting these latter separation lines 56, 58, 60, 62, and 64 is not critical. For ease of separation, the respective separation lines also may be somewhat frangible or clearly marked or both.

Figure 5:
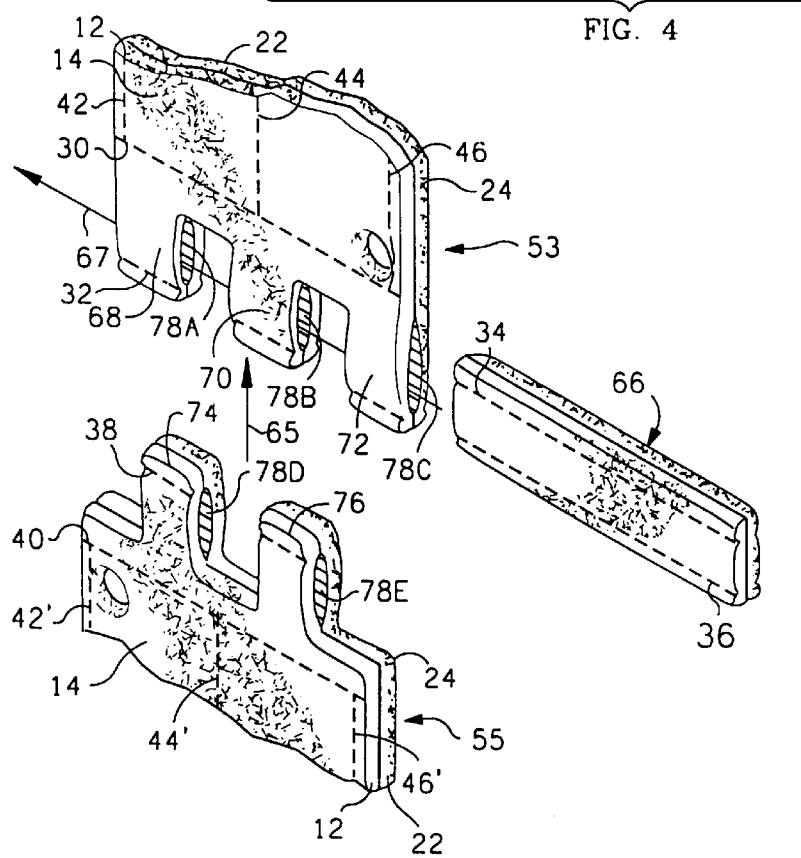
FIG. 5 is a perspective partial view of the connecting process of the belt.

FIG. 3 shows the result of all separations being executed. Tabs 68, 70, 72, 74, and 76 are clearly defined Spaces 69, 71, 73, 75, and 77 are also clearly defined. FIG. 4 reveals that respective tabs and spaces align. Once aligned, connector 66 is inserted through the tabs in the direction depicted by directional arrow 67. FIG. 5 shows greater detail of the connection/adjustment structure and process. Each tab has a slot; first slot 78a in first tab 68, second slot 78b in second tab 70, third slot 78c in third tab 72, fourth slot 78d in fourth tab 74, and fifth slot 78e in fifth tab 76. Slots 78a–c are maintained by first adjustment-attaching means 30 and second adjustment-attaching means 32. Slots 78d–e are maintained by fifth adjustment-attaching means 38 and sixth adjustment-attaching means 40. Second belt section 55 mates with first belt section 53 in the direction reflected by arrow 65. Once the respective tabs and spaces are mated, connector 66 is inserted through the respective slots of the alternating tabs.

Figure 6:
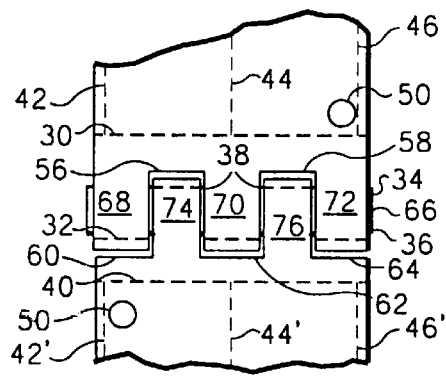
FIG. 6 is a partial view of the belt as connected

FIG. 6 shows belt 10 with first belt section 53 reconnected to second belt section 55. The connection process is suited for sizing a belt to a particular apparatus configuration, for adjusting a belt, and for removing worn or damaged sections without need for replacing the entire belt. In an embodiment of the belt where respective belt-attachment means 42, 44, and 46 run the full length of belt 10, they will occlude first slot 78a, second slot 78b, and third slot 78c of first, second, and third tabs 68, 70, 72, respectively. In such situations, a clear path through such tabs must be cut before connector 66 may be inserted therethrough.

While a specific embodiment/specific embodiments and method of the claimed invention have been shown and fully explained above for the purpose of illustration, it should be understood that many other uses will be found for the instant invention disclosure and many alterations, modifications, and substitutions may be made thereto without departing from the spirit and scope of the invention as defined by the appended claims. Such are intended to be included within the scope of the invention. Accordingly, the scope of the invention should be determined not by the embodiemnt[s] illustrated, but by the appended claims and their legal equivalents.

I claim:

1. An improved skimmer belt comprising:
   a first layer, a second layer, and more than one outer surface, at least one of the said one or more outer surfaces having non-absorbent loop-type fibers;
   at least two apertures transversing said layers and said more than one outer surface;
   adjustment attachment means transversing said layers and said more than one outer surface; and
   belt attachment means transversing said layers and said more than one outer surface;
   whereby said adjustment attachment means and said belt attachment means attach said layers together forming a single-piece belt.

2. The invention as described in claim 1 further having more than two apertures.

3. The invention as described in claim 1 wherein said adjustment attachment means comprises at least one row of horizontal stitching.

4. The invention as described in claim 1 wherein said adjustment attachment means comprises more than one row of horizontal stitching.

5. The invention as described in claim 1 wherein said belt attachment means comprises at least one column of vertical stitching.

6. The invention as described in claim 1 wherein said belt attachment means comprises more than one column of vertical stitching.

7. The invention as described in claim 1 wherein said belt is linear.

8. The invention as described in claim 1 wherein said belt is an endless loop.

9. The invention as described in claim 4 further comprising a belt adjustment means.

10. The invention as described in claim 9 wherein said belt adjustment means comprises at least one removable connectors said at least one removable connector formed between one row of said adjustment attachment means and another row of said adjustment attachment means, a first belt section having a first set of tabs, and a second belt section having a second set of tabs matable with said first set of tabs, said first belt section and said second belt section on opposite sides of said connector, whereby when said connector is removed from said belt and said first set of tabs and said second set of tabs are mated said at least one removable connector is insertable into said tabs to thereby hold said first belt section to said second belt section.

11. The invention as described in claim 10 wherein at least one aperture lies in one of said belt sections.

12. The invention as described in claim 11 wherein said apertures are in opposing corners.

13. The invention as described in claim 9 further comprising more than one belt adjustment means on said belt such that a distance between one belt adjustment means and an adjacent belt adjustment means bears a belt-length to belt-width ratio of about 2:1 to about 12:1.

* * * * *